B. F. GOETHNER, H. ROONEY & R. E. SEIFERT.
COUPLING FOR PIPES, CONDUITS, &c.
APPLICATION FILED AUG. 31, 1912.
1,119,752.
Patented Dec. 1, 1914.
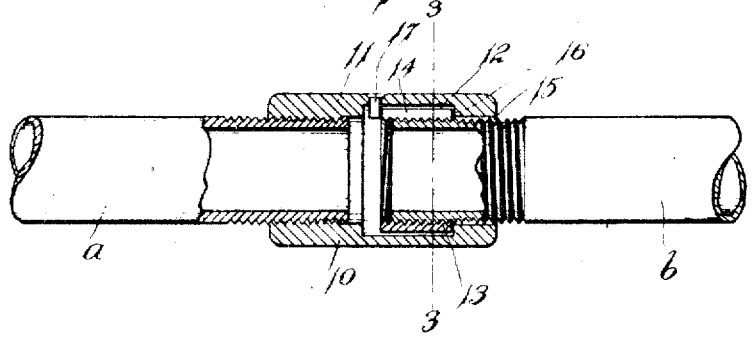
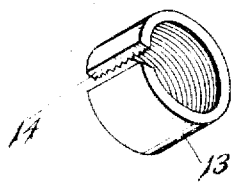
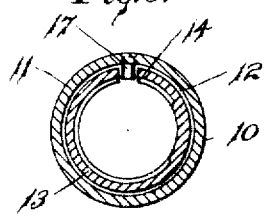
WITNESSES
INVENTORS
Bruno F. Goethner
Hugh Rooney
Rudolf E. Seifert
BY
ATTORNEY

UNITED STATES PATENT OFFICE.

BRUNO F. GOETHNER, HUGH ROONEY, AND RUDOLF E. SEIFERT, OF HARTFORD, CONNECTICUT; SAID GOETHNER AND SAID ROONEY ASSIGNORS TO FRITZ WILLIAM BOCK, OF HARTFORD, CONNECTICUT.

COUPLING FOR PIPES, CONDUITS, &c.

1,119,752.     Specification of Letters Patent.     Patented Dec. 1, 1914.

Application filed August 31, 1912. Serial No. 718,026.

*To all whom it may concern:*

Be it known that we, BRUNO F. GOETHNER and HUGH ROONEY, citizens of the United States, and residents of Hartford and State of Connecticut, and whose post-office addresses are Hartford, Connecticut, and RUDOLF E. SEIFERT, a subject of the Emperor of Germany, and whose residence and post-office address is Hartford, Connecticut, have invented certain new and useful Improvements in Couplings for Pipes, Conduits, &c., of which the following is a specification.

The object of this invention is to produce an improved coupling to connect together the abutting ends of piping, and it is particularly adapted for use in electrical work to connect together the ends of what is known as rigid iron conduit.

More especially we provide a device by means of which pipe or conduit provided with right-hand threads can be secured together and drawn up into proper position. Generally speaking this is accomplished by providing a coupling, one member of which can be held against rotation while a pipe is being screwed into it and then is released so that it will turn freely in the coupling while the other pipe is being screwed in.

An embodiment of the invention is shown in the drawings: Figure 1 shows a central vertical section of a device made in accordance with our invention. Fig. 2 is a perspective view of the split ring, and Fig. 3 is a sectional end view on the line 3—3 of Fig. 1.

*a b* denote the pipes which are to be joined together each of which is provided at its end with a right-hand thread.

10 denotes in general the coupling comprising the sleeve 11, one end of which is threaded to fit the pipe *a*; the other end being recessed as at 12. In this recess is located a ring 13 longitudinally slotted as at 14. The spring of the metal is such as to allow of its being compressed to pass through the opening 15 in the end of the sleeve to position it within the recess, the shoulder 16 preventing its accidental removal. The length of this sleeve with respect to the length of the recess is such that the former can move longitudinally in the recess.

17 is a pin mounted in the sleeve and projecting into the recess and of such a size that it will fit in the slot 14 of the ring 13 and constitute a driving connection between the sleeve 11 and the ring 13, and by means of which a pipe may be threaded into the ring, or the ring threaded onto a pipe.

If now the ring is moved to the extreme left-hand position so that the pin 17 lies in the slot, the ring is held against rotation and the pipe *b* can be readily screwed into it. The sleeve and the ring can now be moved relatively to one another to disengage the ring from the pin, and then the pipe *a* can be screwed into the sleeve 11 or the sleeve 11 can be turned to draw into it the pipe *a*; during this operation the sleeve is free to turn with respect to the ring 13 thus preventing the ring from screwing off of the pipe *b*.

The convenience of using piping or conduit provided with right-hand threads at each end will be readily apparent and there are many cases when this simple coupling can be utilized where it is difficult if not impossible to use the ordinary union with right and left-hand threads.

It is probable that the invention is susceptible of modification and alterations and it is our intention to include in the appended claims any and all such changes of construction which come fairly within the scope of the invention.

We claim as our invention:

1. A coupling comprising a sleeve threaded at one end, an internally threaded member located within said sleeve near one end thereof and adapted for relative movement with respect thereto, and a disengageable driving connection between said sleeve and member.

2. In a device of the character specified a sleeve threaded at one end, an internally threaded member located therein and movable rotarily with respect thereto, and a disengageable driving connection between said sleeve and member.

3. In a device of the character described a sleeve having a thread at one end for engagement with a pipe and a recess at the other end, a member located within said recess and adapted for longitudinal and rotary movement with respect thereto, a thread on said member adapted for engagement with the pipe, and a disengageable driving connection between said sleeve and member.

4. In a coupling device a sleeve having a longitudinal bore, a thread cut into the bore of said sleeve at one end and adapted to engage an end of the pipe, a recess in the other end of the sleeve provided with a shoulder at its outer end, a split ring located within said recess and adapted for longitudinal and rotary movement relative to the sleeve, said ring being interiorly threaded to receive the end of a pipe and means for temporarily holding said ring against relative rotary motion.

5. A coupling device comprising a sleeve threaded at one end to receive the end of a pipe and recessed at its opposite end; a split ring located in the recess and movable longitudinally of the sleeve, means for limiting the extent of longitudinal movement of the ring, a pin mounted in the sleeve and projecting into said recess and adapted to engage said ring in one of its extra positions to hold it against rotation, said ring being threaded to engage the threaded end of a pipe, the threads in said sleeve and ring being both cut in the same direction.

6. A coupling comprising a sleeve provided at one end with threaded means for attachment to a pipe, a member located within the opposite end of said sleeve and adapted for relative rotary and longitudinal movement therein, said member being provided with means for engagement with a pipe, and a disengageable driving connection between said sleeve and member.

7. The herein described article of manufacture comprising a sleeve having at one end an integral threaded means, and at the other end a non-integral means, for engagement with a pipe, said non-integral means being freely movable with respect to said sleeve but having a driving connection therewith while being engaged with a pipe.

8. The herein described article of manufacture comprising a sleeve threaded at one end, an internally threaded member located within and carried by said sleeve and adapted for attachment to a pipe, said member being normally movable relative to said sleeve, and a driving connection between said sleeve and member operative while the latter is being engaged with a pipe.

9. The herein described article of manufacture which is a complete coupling for pipes, conduits, etc., comprising a sleeve threaded at one end for engagement with a pipe, and recessed in its opposite end, a ring located and confined within said recess and threaded to engage the end of a pipe, means on said sleeve engageable with said ring to prevent its rotation relative to said sleeve while it is being threaded onto a pipe, said ring being disengageable from said means to permit of its rotation relative to said sleeve while the latter is being threaded onto a pipe.

BRUNO F. GOETHNER.
HUGH ROONEY.
RUDOLF E. SEIFERT.

Witnesses:
H. E. HART,
G. J. SULLIVAN.

Correction in Letters Patent No. 1,119,752.

It is hereby certified that Letters Patent No. 1,119,752, granted December 1, 1914, upon the application of Bruno F. Goethner, Hugh Rooney, and Rudolf E. Seifert, of Hartford, Connecticut, for an improvement in "Couplings for Pipes, Conduits, &c.," were erroneously issued to Fritz William Bock and said Seifert as owners of the entire interest in said invention, whereas said Letters Patent should have been issued to *Fritz William Bock and Hugh Rooney*, second-named inventor, as owners of the entire interest, said Goethner and Seifert having assigned their interest to said Bock, as shown by the records of assignments in this office; and that the said Letters Patent should be read with this correction therein that the same may conform to the record of the case in the Patent Office.

Signed and sealed this 5th day of January, A. D., 1915.

[SEAL.]

R. F. WHITEHEAD,
*Acting Commissioner of Patents.*